United States Patent
Chang et al.

(10) Patent No.: US 9,540,525 B2
(45) Date of Patent: Jan. 10, 2017

(54) GRAPHENE OXIDE-CERAMIC HYBRID COATING LAYER, AND METHOD FOR PREPARING THE SAME

(71) Applicants: Hyundai Motor Company, Seoul (KR); Korea Institute of Ceramic Engineering and Technology, Seoul (KR)

(72) Inventors: Kwang Il Chang, Gyeonggi-do (KR); Chul Kyu Song, Seoul (KR); Dha Hae Kim, Gangwon-do (KR); Seung Hun Hur, Seoul (KR)

(73) Assignees: Hyundai Motor Company, Seoul (KR); Korea Institute of Ceramic Engineering and Technology, Seoul (KR)

( * ) Notice: Subject to any disclaimer, the term of this patent is extended or adjusted under 35 U.S.C. 154(b) by 140 days.

(21) Appl. No.: 14/145,089

(22) Filed: Dec. 31, 2013

(65) Prior Publication Data

US 2015/0111045 A1    Apr. 23, 2015

(30) Foreign Application Priority Data

Oct. 22, 2013 (KR) .................. 10-2013-0125886

(51) Int. Cl.
| | | |
|---|---|---|
| *B05D 1/00* | (2006.01) |
| *C09D 5/26* | (2006.01) |
| *B05D 1/02* | (2006.01) |
| *B05D 1/18* | (2006.01) |
| *B05D 1/28* | (2006.01) |
| *B05D 1/30* | (2006.01) |
| *B05D 1/40* | (2006.01) |
| *C03C 17/25* | (2006.01) |

(52) U.S. Cl.
CPC ............... *C09D 5/26* (2013.01); *B05D 1/005* (2013.01); *B05D 1/02* (2013.01); *B05D 1/18* (2013.01); *B05D 1/28* (2013.01); *B05D 1/30* (2013.01); *B05D 1/40* (2013.01); *C03C 17/256* (2013.01); *C03C 2217/23* (2013.01)

(58) Field of Classification Search
CPC ............. B05D 1/02; B05D 1/08; B05D 1/28; B05D 1/30; B05D 1/40; B05D 1/18; B05D 1/005; C09D 5/26; C03C 17/256; C03C 2217/23
USPC ................. 427/240, 427, 428.01, 430.1
See application file for complete search history.

(56) References Cited

U.S. PATENT DOCUMENTS

| | | | |
|---|---|---|---|
| 8,257,867 B2 | 9/2012 | Liu et al. | |
| 2003/0187124 A1* | 10/2003 | Hirata | B82Y 30/00 524/496 |

(Continued)

FOREIGN PATENT DOCUMENTS

| | | |
|---|---|---|
| KR | 10-2012-0035659 | 4/2012 |
| KR | 10-2012-0039799 A | 4/2012 |

(Continued)

*Primary Examiner* — Kirsten Jolley
(74) *Attorney, Agent, or Firm* — Mintz Levin Cohn Ferris Glovsky and Popeo, P.C.; Peter F. Corless

(57) ABSTRACT

A graphene oxide-ceramic hybrid coating layer formed from a graphene oxide-ceramic hybrid sol solution that includes graphene oxide (GO) and a ceramic sol and a method of preparing the coating layer are provided. A content of graphene oxide in the graphene oxide-ceramic hybrid coating layer is about 0.002 to about 3.0 wt % based on the total weight of the graphene oxide-ceramic hybrid coating layer.

11 Claims, 8 Drawing Sheets

(56) References Cited

U.S. PATENT DOCUMENTS

| | | | |
|---|---|---|---|
| 2007/0092432 A1* | 4/2007 | Prud'Homme | C01B 31/043 423/448 |
| 2010/0323178 A1* | 12/2010 | Ruoff | C04B 35/14 428/220 |
| 2012/0149554 A1 | 6/2012 | Lin et al. | |
| 2014/0299820 A1* | 10/2014 | Harandek | H01B 1/18 252/508 |

FOREIGN PATENT DOCUMENTS

| KR | 10-2012-0053399 | 5/2012 |
| KR | 10-2012-0092431 | 8/2012 |
| KR | 10-2013-0014327 A | 2/2013 |

* cited by examiner

FIG. 5
(A)  (B)
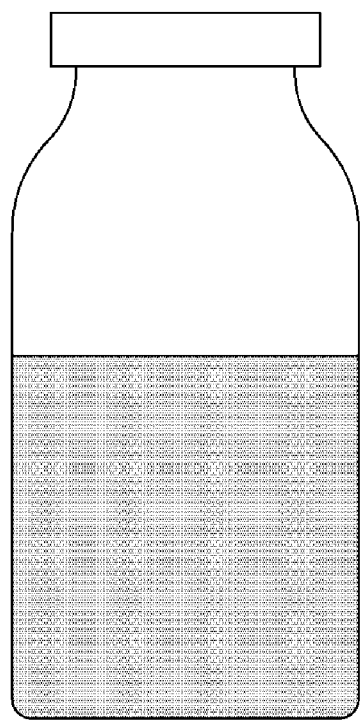 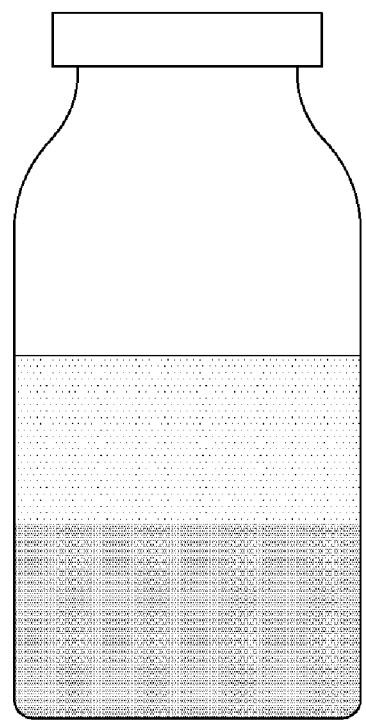

GRAPHENE OXIDE-CERAMIC HYBRID COATING LAYER, AND METHOD FOR PREPARING THE SAME

CROSS-REFERENCE TO RELATED APPLICATION

This application claims priority to and the benefit of Korean Patent Application No. 10-2013-0125886 filed in the Korean Intellectual Property Office on Oct. 22, 2013, the entire contents of which are incorporated herein by reference.

BACKGROUND (a) Field of the Invention

This disclosure relates to a graphene oxide-ceramic hybrid coating layer and a method for preparing the same.

(b) Description of the Related Art

Graphene oxide (or graphite oxide, hereinafter GO) is a sheet-shaped carbon material prepared by acid treatment of graphite, and has a substantial amount of a hydrophilic functional group, for example, a carboxyl group (—COOH), a hydroxyl group (—OH), and the like, on the surface. The surface oxidizing groups produced through an acid treatment process naturally produce hydrogen bonds with water ($H_2$) and thus the GO prepared by such process is hydrated or in a form of a water-containing slurry state. In general, a solid content of the slurry is about 2 to 8 wt % without further treatments.

When the GO is appropriately included in a film or a structure, it provides improved strength and suitable thermal conductivity. However, a treatment that removes contained moisture may deteriorate such properties. In general, GO may be prepared in a form of graphene through a chemical reduction method (e.g., a hydrazine treatment and the like) and a thermal reduction method. Hereafter, the reduced graphene is particularly referred to be as reduced graphene oxide (RGO).

It is evidenced that at least a part of the oxidizing groups on the RGO surface is not thoroughly removed. Generally, an oxygen content of the surface oxidizing groups is less than or equal to about 5 wt % of total carbon backbone content. Thus, the graphene oxide (RGO) of the present invention has an oxygen content of less than or equal to about 5 wt % of total carbon backcone content as being consistent with the oxygen content of the surface oxidizing group.

A heterogeneous mixture of GO or RGO and conventional materials has been recently highlighted which may provide synergic effects of conventional materials and eliminate limitations of those. The heterogeneous mixture may be used for a high strength composite material and a fuel cell. Various developed technologies include, a graphene-nanowire (e.g., semiconductor) hybrid structure where light energy is absorbed in a graphene conductive part and electron-hole pairs are generated, a hybrid composite manufacturing method including graphene sheet/carbon nanotube/a polymer nanoparticle, a method of manufacturing a positive electrode graphene material for a lithium rechargeable battery that is a hybrid material formed by adding an iron (Fe) precursor and a phosphate ($PO_4$) precursor, a method of manufacturing a graphene composite calcinated body having an improved charge and discharge ratio by sintering graphene and a metal oxide particle in air, a method of manufacturing a graphene-titanium dioxide ($TiO_2$) hybrid material by mixing a $TiO_2$ nanopowder with graphene at a high temperature and high pressure and reacting them.

Therefore, with the recent needs for the heterogeneous GO coating materials, the present invention provides a coating sol solution for forming a GO-ceramic hybrid layer having transparency and thermal conductivity using GO and a ceramic.

SUMMARY

One exemplary embodiment of the present invention provides a coating sol solution that forms a graphene oxide-ceramic hybrid coating layer having improved dispersion and storage stability features.

Another exemplary embodiment of the present invention provides a graphene oxide-ceramic hybrid coating layer that has improved uniformity and transparency. Additionally, another exemplary embodiment of the present invention provides a method for preparing the graphene oxide-ceramic hybrid coating layer and a graphene oxide-ceramic hybrid coating layer prepared by the method thereof. A further exemplary embodiment of the present invention provides a vehicle headlamp that includes the graphene oxide-ceramic hybrid coating layer.

According to one exemplary embodiment of the present invention, a graphene oxide-ceramic hybrid coating layer may be formed from a graphene oxide-ceramic hybrid sol solution including graphene oxide (GO) and a ceramic sol, wherein a content of graphene oxide in the graphene oxide-ceramic hybrid coating layer may be about 0.002 to about 3.0 wt % based on the total weight of the graphene oxide-ceramic hybrid coating layer.

The content of graphene oxide in the graphene oxide-ceramic hybrid coating layer may be about 0.03 to about 2.5 wt % based on the total weight of the graphene oxide-ceramic hybrid coating layer. In addition, the graphene oxide and the ceramic sol may be uniformly distributed in the graphene oxide-ceramic hybrid sol solution. In particular embodiment, the ceramic sol may include, without limitation, silicon dioxide ($SiO_2$), aluminum oxide ($Al_2O_3$), lithium titanium oxide ($Li_4Ti_5O_{12}$), $TiO_2$, tin oxide ($SnO_2$), cerium oxide ($CeO_2$), zirconium dioxide ($ZrO_2$), vanadium oxide ($V_2O_5$), boron oxide ($B_2O_3$), barium titanium oxide ($BaTiO_3$), yttrium oxide ($Y_2O_3$), tungsten trioxide ($WO_3$), magnesium oxide (MgO), copper oxide (CuO), zinc oxide (ZnO), aluminum phosphate ($AlPO_4$), aluminum fluorine (AlF), silicon nitride ($Si_3N_4$), aluminum nitride (AlN), titanium nitride (TiN), tungsten carbide (WC), silicon carbide (SiC), titanium carbide (TiC), molybdenum disilicide ($MoSi_2$), iron oxide ($Fe_2O_3$), germanium dioxide ($GeO_2$), lithium oxide ($Li_2O$), manganese oxide (MnO), nickel oxide (NiO), zeolite, or a combination thereof.

According to another exemplary embodiment of the present invention, a method for preparing a graphene oxide-ceramic hybrid coating layer may include: preparing a solution that includes a graphene oxide slurry replaced by a first non-aqueous based solvent; combining the solution with a second non-aqueous based solvent and a ceramic precursor to prepare a mixture; adding a dispersing agent and water to the mixture to prepare a graphene oxide-ceramic hybrid sol solution; and coating a substrate with the graphene oxide-ceramic hybrid sol solution.

The process of preparing a solution including the graphene oxide slurry replaced by a first non-aqueous based solvent may include performing mechanical dispersion treatment and centrifugation after mixing the graphene oxide aqueous slurry and the first non-aqueous based solvent. The mechanical dispersion treatment and centrifugation may be repeated at least twice, and the method may further include separating a supernatant after each centrifugation. The mechanical dispersion treatment may be ultrasonication, stiffing, a shear stress (e.g., shearing force) application, using a homogenizer, or a combination thereof. In particular the centrifugation may be performed at a rotation speed of about 1200 to about 3500 rpm.

In another exemplary embodiment, the graphene oxide in the graphene oxide slurry replaced by the first non-aqueous based solvent may be included in an amount of about 2 to about 7 wt % based on the total weight of the graphene oxide slurry replaced by the first non-aqueous based solvent. The first non-aqueous based solvent and the second non-aqueous based solvent may be an amphiphilic solvent, a water-miscible solvent, a water-immiscible solvent, a polar solvent, a nonpolar solvent, or a combination thereof.

In another exemplary embodiment, the first non-aqueous based solvent and the second non-aqueous based solvent may be IPA (isopropyl alcohol), ethanol, acetone, methylethylketone, methyl alcohol, ethyl alcohol, isopropyl alcohol, acetylacetone, butyl alcohol, ethylene glycol, polyethylene glycol, tetrahydrofuran, dimethylformamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, or a combination thereof. The dispersing agent may be polyethylene glycol (PEG), glycerol, hydrochloric acid (HCl), acetic acid, formic acid, citric acid, a polymer, or a combination thereof. The sol solution for a graphene oxide-ceramic hybrid coating layer composition may further include an additive selected from the group consisting of polyethylene glycol, glycerin, glucose, a polymer, and a combination thereof. In addition, the coating process may be performed by dip coating, spin coating, spray coating, paint coating, bar coating, flow coating, roll coating, or a combination thereof.

According to another exemplary embodiment of the present invention, the graphene oxide-ceramic hybrid coating layer may be prepared by the above manufacturing method. In addition, a vehicle headlamp that includes the graphene oxide-ceramic hybrid coating layer may be provided. The graphene oxide-ceramic hybrid sol solution may have improved dispersion and storage stability features, a graphene oxide-ceramic hybrid coating layer that includes the same and may have improved uniformity and transparency, and a method for preparing the same may be provided.

BRIEF DESCRIPTION OF THE DRAWINGS

The above and other features and advantages of the present invention will become more apparent by describing in detail exemplary embodiments thereof with reference to the attached drawings in which:

FIG. 5 shows an exemplary image exhibiting storage stability of a sol solution for a graphene oxide-ceramic hybrid coating layer according to Evaluation 3 of the present invention.

Figure 1:
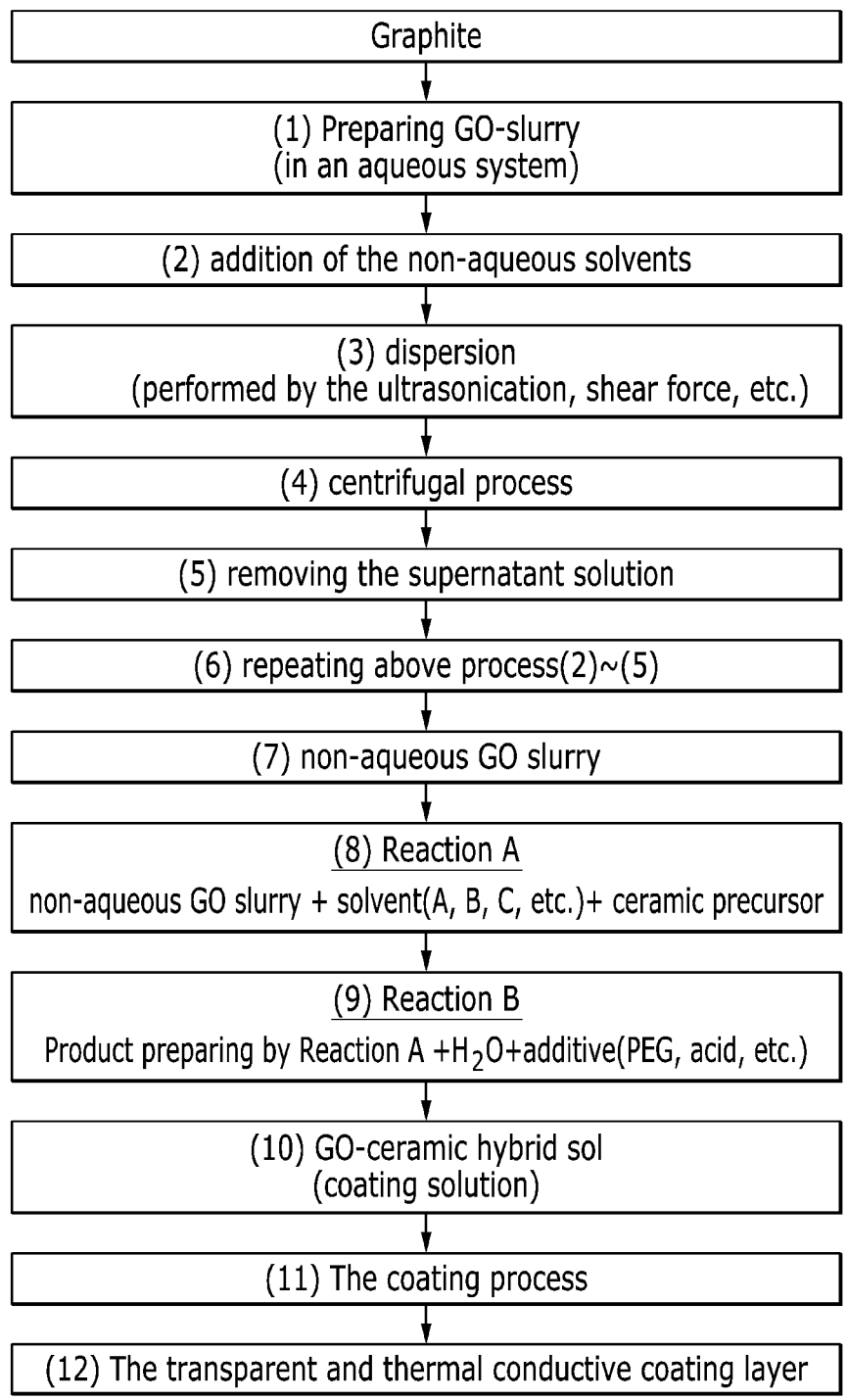
FIG. 1 shows exemplary methods for preparing a graphene oxide-ceramic hybrid sol solution according to the related art.
Figure 2:
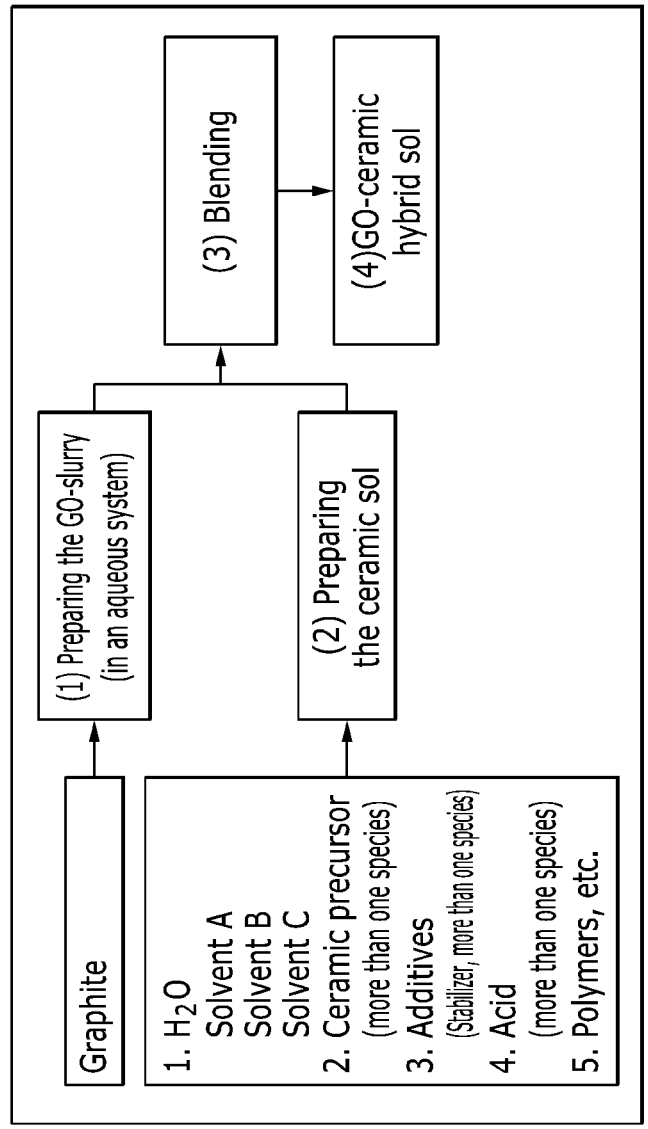
FIG. 2 shows an exemplary graphene oxide-ceramic hybrid sol solution preparation method according to an exemplary embodiment of the present invention.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention are described in detail. However, these exemplary embodiments are exemplary, and this disclosure is not limited thereto.

A coating layer of a graphene oxide-ceramic hybrid may be formed from a graphene oxide-ceramic hybrid sol solution that includes graphene oxide (GO) and a ceramic sol. A content of graphene oxide in the coating layer may be about 0.002 to about 3.0 wt % based on the total weight of the coating layer. When the graphene oxide content of the graphene oxide-ceramic hybrid coating layer is less than about 0.002 wt %, the coating layer may have reduced thermal conductivity and strength. On the other hand, when the graphene oxide content of the coating layer is greater than about 3.0 wt %, uniformity and transparency of the coating layer may not be maintained.

To provide a graphene oxide-ceramic hybrid coating layer having improved uniformity and transparency, uniformity of the graphene oxide-ceramic hybrid sol solution for forming the graphene oxide-ceramic hybrid coating layer should be increased. Thus, when the graphene content in the coating layer is maintained within the weight percentage range, improved uniformity and transparency may be achieved. The graphene oxide content that may improve uniformity and transparency of the graphene oxide-ceramic hybrid coating layer may be about 0.002 to about 3.0 wt % based on the total weight of the coating layer.

In another exemplary embodiment, the ceramic sol may include, without limitation, $SiO_2$, $Al_2O_3$, $Li_4Ti_5O_{12}$, $TiO_2$, $SnO_2$, $CeO_2$, $ZrO_2$, $V_2O_5$, $B_2O_3$, $BaTiO_3$, $Y_2O_3$, $WO_3$, MgO, CuO, ZnO, $AlPO_4$, AlF, $Si_3N_4$, MN, TiN, WC, SiC, TiC, $MoSi_2$, $Fe_2O_3$, $GeO_2$, $Li_2O$, MnO, NiO, zeolite, or a combination thereof. In addition, the ceramic sol may include $TiO_2$, $SiO_2$, CeO2, ZnO, $Al_2O_3$, $SnO_2$, or a combination thereof.

According to another exemplary embodiment, a method for preparing a graphene oxide-ceramic hybrid coating layer may include: preparing a solution that includes a graphene oxide slurry replaced by a first non-aqueous based solvent; combining the solution with a second non-aqueous based solvent and a ceramic precursor to prepare a mixture; adding a dispersing agent and water to the mixture to prepare a graphene oxide-ceramic hybrid sol solution; and coating a substrate with the graphene oxide-ceramic hybrid sol solution.

The preparation of a solution that includes a graphene oxide slurry replaced by a first non-aqueous based solvent may be the first process of preparing the graphene oxide-ceramic hybrid coating layer to replace an aqueous environment of the graphene oxide slurry into a non-aqueous surface environment. In particular, the process may include performing mechanical dispersion treatment and centrifugation after mixing the graphene oxide aqueous slurry and the first non-aqueous based solvent. The mechanical dispersion treatment and centrifugation may be performed at least twice In addition, the method may further include separating a supernatant after each step of centrifugation.

The properties, such as viscosity or color, may not be significantly different during preparation of the graphene oxide-ceramic hybrid sol solution based on the number of mechanical dispersion treatments and centrifugation. However, as evidenced in Evaluation 3 and FIG. 5, storage stability of the graphene oxide-ceramic hybrid sol solution may be improved when the mechanical dispersion treatment and centrifugation are performed at least twice. When moisture is effectively removed to prevent miscibility with the ceramic sol and a more non-aqueous surface environment is obtained as replacing process of the aqueous environment by the non-aqueous environment is repeated, the storage stability of the graphene oxide-ceramic hybrid sol solution may be improved.

In addition, water molecules that make hydrogen bonds with the hydrophilic functional groups on the graphene oxide surface, for example carboxyl groups (—COOH), hydroxyl groups (—OH), and the like, may be removed by replacing the aqueous surface environment of the graphene oxide slurry into the non-aqueous environment. Furthermore, in the subsequent process of mixing the graphene oxide slurry with the ceramic sol solution, uniformity of a mixed solution may be maintained.

Moreover, the mechanical dispersion treatment may include ultrasonication, stirring, a shear stress (e.g., shearing force) application, using a homogenizer, or a combination thereof. In addition, the centrifugation may be performed at a rotation speed of about 1200 to about 3500 rpm, and specifically at a rotation speed of about 2000 to about 3300 rpm.

The non-aqueous graphene oxide slurry may be directly added to the ceramic sol solution by adding the graphene oxide slurry replaced by the first non-aqueous based solvent solution to the second non-aqueous based solvent and ceramic precursor and then mixed. With this preparation method, wrinkles of graphene oxide sheets which may be formed during a mixing process with a ceramic sol having high specific gravity and viscosity may be alleviated. Furthermore, since the ceramic sol and graphene oxide may be substantially dispersed in the non-aqueous based solvent, mobility of ions and chemical species derived from the ceramic precursor may be improved when a network of the ceramic precursor is formed in a ceramic sol (e.g., sol reaction).

The graphene oxide in the graphene oxide slurry replaced with the first non-aqueous based solvent may be included in an amount of about 2 to about 7 wt % based on the total weight of the graphene oxide slurry replaced with the first non-aqueous based solvent. When the solid content of the graphene oxide is within the range of about 2 to 7 wt %, ceramic precursor molecule species may be maximally adsorbed on the sheet-shaped nanostructure of graphene oxide, and thus a substantially uniform graphene oxide-ceramic sol solution may be formed.

In particular, the ceramic precursor may be, without limitation, titanium iso-propoxide (TTIP) and tetramethyl orthosilicate (TMOS). In addition, the first non-aqueous based solvent may be an amphiphilic solvent, a water-miscible solvent except water, a water-immiscible solvent, a polar solvent, a nonpolar solvent, or a mixed solvent. The first non-aqueous based solvent may include, without limitation, IPA (isopropyl alcohol), ethanol, acetone, methylethylketone, methyl alcohol, ethyl alcohol, isopropyl alcohol, acetylacetone, butyl alcohol, ethylene glycol, polyethylene glycol, tetrahydrofuran, dimethylformamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, or a combination thereof.

Furthermore, the second non-aqueous based solvent may be added as a dilution solvent or a sol stability solvent. The second non-aqueous based solvent may be the same as the first non-aqueous based solvent and may be homogeneous or heterogeneous, and may be a combination thereof. The dispersing agent may include, without limitation, polyethylene glycol (PEG), glycerol, hydrochloric acid (HCl), acetic acid, formic acid, citric acid, a polymer, or a combination thereof. The additive may include, without limitation, polyethylene glycol, glycerin, glucose, a polymer, and a mixture thereof. In addition to the first dispersing agent, a binder dispersing agent, a curing agent, a polymer, an inorganic-based powder, and the like may be further included as other additives.

Finally, a substrate may be coated with the prepared sol solution for the graphene oxide-ceramic hybrid coating layer composition. The coating process may be performed by a general coating method, such as, dip coating, spin coating, spray coating, paint coating, bar coating, flow coating, roll coating, or a combination thereof. In particular, the coating process may be, but is not limited to, dip coating, spin coating, or spray coating.

The coating process is not limited to types or shapes of substrates, such as a substantially large area, a curved substrate, and the like.

According to another exemplary embodiment, a graphene oxide-ceramic hybrid coating layer may be prepared by the above preparation method. The coating layer may be applied to a vehicle headlamp. Particularly, due to the improved thermal conductivity of the coating layer as described above, fogging caused by lamp heat in the vehicle head lamp may be suppressed due to effects of the present invention. As a specific industrial application, it may be applied to a lens (e.g., PC curved substrate) of a vehicle head lamp to reduce fogging problems.

Hereinafter, specific exemplary embodiments of the present invention are described. However, the specific exemplary embodiments are merely used to exemplarily illustrate in more detail, and are not to be seen as limiting the present invention. Furthermore, what is not described in this disclosure may be sufficiently understood by those skilled in the art who have knowledge in this field.

Preparation Example 1

Preparation of Aqueous GO Slurry 10 g of natural graphite and 7.5 g of sodium nitrate were placed in a reactor and 621 g of 96% sulfuric acid was slowly added while stirring. After the three materials were sufficiently mixed, 45 g of manganese peroxide was added. Since the manganese peroxide has an explosion risk and generates heat and gases when reacting with strong sulfuric acid, the manganese peroxide may be added slowly over about 1 hour. After adding the manganese peroxide, the resultant was stirred at room temperature and reacted for about 4 to 6 days. Then, 1 L of 5% sulfuric acid solution was added. Since a substantial amount of heat and gases could be generated, the reactor was suitably cooled and the sulfuric acid was added slowly over 1 hour. Further, the resultant was placed at room temperature for one day while being stirred. After one day, 30 g of 30% hydrogen peroxide was slowly added and reacted for 2 hours. To remove a substantial amount of sulfuric acid and hydrogen peroxide in the resulting product, washing and centrifugation were performed repeatedly. The process was performed as follows: centrifugation was performed to remove a supernatant, a mixed solution including 3% sulfuric acid and 0.5% hydrogen peroxide at 1:1 was placed in the remaining precipitate, and the resultant was sufficiently agitated and centrifuged and a supernatant was removed. Further, the mixed solution was added to the remaining precipitate and mixed. These processes were repeated 15 times, and then the mixed solution was replaced by water 5-6 times to obtain an aqueous graphene-oxide (GO) slurry.

GO slurry is generally a material produced by acid treatment and reaction of graphite and purification processes, and thus GO slurry in the exemplary embodiment of the present invention may be a generally-known sheet-shaped graphene oxide or graphite oxide, without limitation. In general, aqueous GO slurry has a solid content of 2 to 8 wt % based on centrifuged product.

Preparation Example 2

Preparation of IPA-Containing GO Slurry 100 g of the aqueous GO slurry (e.g., solid content by thermal analysis 2.5%) was placed in a 500 mL plastic bottle, 300 ml of IPA was added thereto, and the mixture was ultrasonication-dispersed for 5 minutes. GO solution dispersed in $H_2O$/IPA was centrifuged at 3000 rpm, supernatant was removed, and the IPA adding process and removing process of the supernatant were repeated 10 times. Accordingly, IPA-containing GO slurry was obtained. When IPA addition-dispersion-centrifugation-supernatant removal processes were performed at least three times, efficiency of $H_2O$ removal was improved.

Preparation Example 3

Preparation of DMF-Containing GO Slurry 100 g of aqueous GO slurry (e.g., solid content by thermogravimetric analysis: 2.5%) was placed in a 500 mL plastic bottle, 300 ml of DMF was added thereto, the mixture was homogenized with a homogenizer at 15,000 rpm for 5 minutes, and a supernatant was removed after centrifugation was performed at 3000 rpm. The DMF adding process and removing process of the supernatant were repeated 10 times. Accordingly, DMF-containing GO slurry was obtained.

Preparation Example 4

Preparation of Ethanol-Containing GO Slurry 100 g of aqueous GO slurry (e.g., solid content by thermal analysis: 2.5%) was placed in a 500 mL plastic bottle, 300 ml of ethanol was added thereto, the mixture was homogenized with a homogenizer at 15,000 rpm for 5 minutes, and a supernatant was removed after centrifugation was performed at 3000 rpm. The ethanol adding process and removing process of the supernatant were repeated 10 times. Accordingly, ethanol-containing GO slurry was obtained.

Example 1

Preparation of GO-$TiO_2$ Hybrid Sol Solution

Additional solvents, 100 ml of IPA, and 50 ml of acetylacetone were added to 1200 mg of the GO slurry (e.g., solid content by thermal analysis: 3.0%, IPA 97%) replaced by the first solvent, IPA, according to Preparation Example 2, 50 ml of titanium iso-propoxide (TTIP) as a $TiO_2$ ceramic precursor reagent, was added thereto, and the mixture was agitated for greater than or equal to 30 minutes (e.g., a reactant A). The process produces TTIP ion species and chemical species that substantially uniformly contact the surface of a GO sheet-shaped structure and provide substantial uniformity of sol prepared in the next step. Further, 150 ml of water, 20 g of PEG (polyethylene glycol), and 1 ml of HCl were added to the reactant A, and the mixture was substantially uniformly reacted (e.g., agitated) for 90 minutes, preparing a GO-TiO$_2$ hybrid sol solution. The hybrid sol was not precipitated but was substantially uniformly applied without a stain.

Preparation of GO-TiO$_2$ Hybrid Coating Layer

The GO-TiO$_2$ hybrid coating sol solution was spin-coated on a glass substrate that was plasma-treated on the surface (e.g., 800 rpm), and the spin-coated layer was vacuum-dried at room temperature and heat-treated at 180° C. for 1 hour to prepare a GO-TiO$_2$ hybrid coating layer. Herein, the obtained hybrid layer included GO content of about 0.03-0.06 wt % (e.g., content of carbon).

Example 2

Preparation of GO-TiO$_2$ Hybrid Sol Solution

Additional solvents, 100 ml of DMF, and 50 ml of acetylacetone, were added to 800 mg of the GO slurry (e.g., solid content by thermal analysis: 2.8%, IPA 97.2%) replaced by the solvent, DMF, according to Preparation Example 3. Further, 50 ml of titanium iso-propoxide (TTIP) as a TiO$_2$ ceramic precursor reagent was added thereto, and the mixture was agitated for greater than or equal to 30 minutes (e.g., a reactant A). The process produces TTIP ion species and chemical species that substantially uniformly contact the surface of a GO sheet-shaped structure and provides substantial uniformity of a sol prepared in the next step. In addition, 150 ml of water, 20 g of PEG (polyethylene glycol), and 1 ml of HCl were added to the reactant A, and the mixture was substantially uniformly reacted (e.g., agitated) for 90 minutes, preparing a GO-TiO$_2$ hybrid sol solution. This hybrid sol was not precipitated but was substantially uniformly applied without a stain.

Example 3

Preparation of GO-TiO$_2$ Hybrid Sol Solution

Additional solvents, 70 ml of IPA, 30 ml of DMF, and 50 ml of acetylacetone were added to 800 mg of the GO slurry (e.g., solid content by thermal analysis: 2.8%, IPA 97.2%) replaced by the solvent, IPA according to Preparation Example 2. In addition, 50 ml of titanium iso-propoxide (TTIP) as a TiO$_2$ ceramic precursor reagent was added thereto, and the mixture was agitated for greater than or equal to 30 minutes (a reactant A). The process produces TTIP ion species and chemical species that substantially uniformly contact the surface of a GO sheet-shaped structure and provides substantial uniformity of a sol prepared in the next step. Further, 150 ml of water, 20 g of PEG (polyethylene glycol), 0.7 ml of HCl, 0.3 ml of acetic acid, and 0.5 ml of citric acid were added to the reactant A, and the mixture was substantially uniformly reacted (e.g., agitated) for 90 minutes, preparing a GO-TiO$_2$ hybrid sol solution. The hybrid sol was not precipitated but was substantially uniformly applied without a stain.

Preparation of GO-TiO$_2$ Hybrid Coating Layer

The GO-TiO$_2$ hybrid sol solution was spray-coated on a polycarbonate (PC) substrate that was plasma-treated on the surface. The spray coating layer was vacuum-dried at 50° C. and heat-treated on the surface by repeatedly applying instant thermal impacts with an IR lamp. The heat treatment was performed at 300° C., the exposure time was 3 seconds, and the treatment was repeatedly performed. The treatments were repeated until the temperature of the substrate decreased sufficiently to room temperature. Meanwhile, the lower part of the substrate was water-cooled (or air cooled), to prevent the temperature of the substrate from being greater than or equal to 100° C.

Example 4

Preparation of GO-SiO$_2$ Hybrid Sol Solution 100 ml of ethanol was added to the 3 g of GO slurry (e.g., solid content 5%, ethanol 95%) replaced by the solvent, ethanol according to Preparation Example 4, 10 ml of TMOS (tetramethyl orthosilicate) was added, and the mixture was agitated for more than or equal to 30 minutes. Herein, the TMOS did not become sol yet, and substantially uniformly contacted the interface of the GO. Further, 50 mL of water and 3 g of PEG were added to the solution, and the mixture was agitated for one hour to prepare a GO-SiO$_2$ hybrid sol solution.

Preparation of GO-SiO$_2$ Hybrid Coating Layer

The prepared GO-SiO$_2$ hybrid coating sol solution was spray-coated on a glass substrate that was plasma-treated on the surface. The spray coating layer was vacuum-dried at 80° C., and heat-treated under a nitrogen atmosphere at 300° C. for 3 hours. The GO content (e.g., content of carbon) of the obtained hybrid layer was about 2.5 wt %.

Comparative Example 1

Ceramic Sol

A TiO$_2$ sol solution was prepared subsequently using 50 mL of IPA, adding 50 mL of titanium iso-propoxide (TTIP) as a TiO$_2$ ceramic precursor reagent thereto, agitating the mixture for more than or equal to 30 minutes, adding 10 mL of water, 10 g of PEG (polyethylene glycol), and 1 mL of HCl thereto, and then substantially uniformly reacting (e.g., agitating) the resulting mixture for 90 minutes.

Comparative Example 2

Simple Mixing

A TiO$_2$ sol solution was prepared subsequently using 50 mL of acetylacetone, adding 50 mL of titanium iso-propoxide (TTIP) as a TiO$_2$ ceramic precursor reagent thereto, agitating the mixture for more than or equal to 30 minutes, adding 10 mL of water, 10 g of PEG (polyethylene glycol), and 1 mL of HCl thereto, and substantially uniformly reacting (e.g., agitating) the resulting mixture for 90 minutes. Further, 20 mg of the graphene oxide aqueous slurry according to Preparation Example 1 was added to the TiO$_2$ sol solution to obtain a mixture.

Evaluation 1

Figure 3:
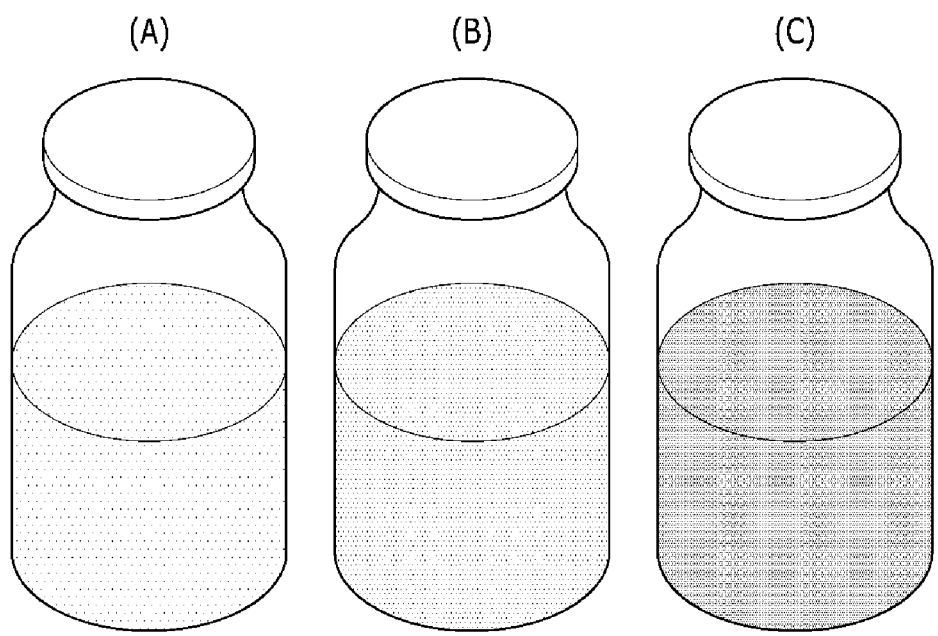
FIG. 3 shows an exemplary image exhibiting stability and uniformity of graphene oxide-ceramic hybrid sol solutions according to Evaluation 1 and Comparative Examples 1 and 2 or the present invention.

Uniformity (Stability) of Sol Solution for Graphene Oxide-Ceramic Hybrid Coating Layer As shown in FIG. 3, uniformity (e.g., stability) of a sol solution for a graphene oxide-ceramic hybrid coating layer of (C) according to one exemplary embodiment of the present invention and a sol solution for a graphene oxide-ceramic hybrid coating layer (B) prepared by simply mixing a graphene oxide dispersion and a ceramic sol solution according to Comparative Example 2 was evaluated by examining images of each sol solution.

FIG. 3 shows an exemplary image exhibiting stability and uniformity of sol solutions for a graphene oxide-ceramic hybrid coating layer according to one exemplary embodiment and Comparative Examples 1 and 2. In particular, (A) in FIG. 3 shows the sol solution for a graphene oxide-ceramic hybrid coating layer according to Comparative Example 1, and (B) shows the sol solution for a graphene oxide-ceramic hybrid coating layer according to Comparative Example 2. Additionally, (C) in FIG. 3 shows the sol solution for a graphene oxide-ceramic hybrid coating layer according to one exemplary embodiment of the present invention.

Referring to FIG. 3, the simple mixture according to Comparative Example 2 showed abruptly decreased stability of the sol solution due to excessive moisture in the graphene oxide slurry, and as shown in (B), degrees of stability decrease may be seen from solution cloudiness. Further, the sol solution for a graphene oxide-$TiO_2$ hybrid coating layer according to one exemplary embodiment of the present invention was substantially uniform as shown in (C), and this uniformity of the sol solution further influences the uniformity and stability of a coating layer. The uniformity and stability were advantageous effects of the present invention that could not be obtained from a conventional simply-mixed solution.

Evaluation 2

Uniformity of Coating Layer of Graphene Oxide-Ceramic Hybrid

Figure 4:
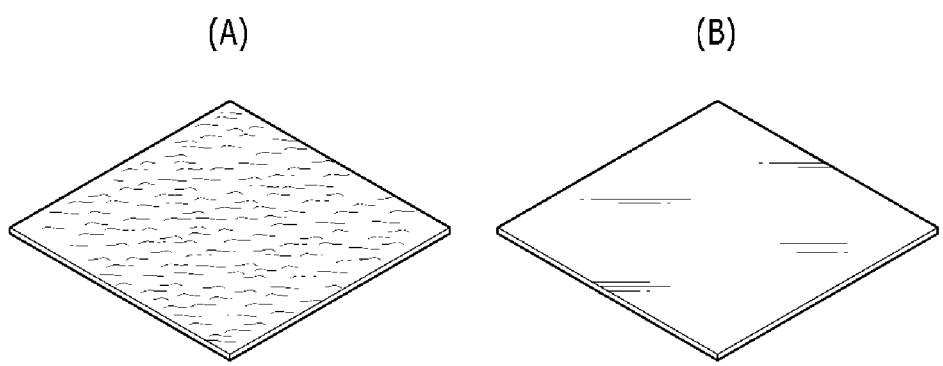
FIG. 4 shows an exemplary image exhibiting uniformity of coating layers of graphene oxide-ceramic hybrids according to Evaluation 2 and Comparative Example 2 of the present invention.

Uniformity of a graphene oxide-ceramic hybrid coating layer according to one exemplary embodiment of the present invention and the graphene oxide-ceramic hybrid coating layer formed by the simple mixture of a graphene dispersion and a ceramic sol solution according to Comparative Example 2 was evaluated. In FIG. 4, PC substrates which are spin-coated individually with the sol solution for a graphene oxide-ceramic hybrid coating layer according to one exemplary embodiment of the present invention (B) and the sol solution for the graphene oxide-ceramic hybrid coating layer according to Comparative Example 2 (A) are shown.

FIG. 4 shows exemplary images exhibiting substantial uniformity of coating layers of a graphene oxide-ceramic hybrid according to one exemplary embodiment and Comparative Example 2. In particular, (A) in FIG. 4 shows a PC substrate coated with the coating layer according to Comparative Example 2, and (B) shows a PC substrate coated with the coating layer according to one exemplary embodiment of the present invention. Further, (A) shows that the coating layer according to the Comparative Example 2 was non-uniform or peeled off. However, (B) shows that the coating layer according to one exemplary embodiment of the present invention showed improved uniformity and transparency.

Evaluation 3

Storage Stability of Sol Solution for Graphene Oxide-Ceramic Hybrid Coating Layer To evaluate storage stability of a sol solution for a graphene oxide-ceramic hybrid coating layer according to one exemplary embodiment of the present invention, sol solutions for a graphene oxide-ceramic hybrid coating layer of which a mechanical dispersion treatment and centrifugation were performed at least twice, and performed once, respectively, were stored in a refrigerator for 3 days.

FIG. 5 shows an exemplary image exhibiting storage stability of a sol solution for a graphene oxide-ceramic hybrid coating layer according to one exemplary embodiment. In particular, (A) of FIG. 5 shows the sol solution for a graphene oxide-ceramic hybrid coating layer according to one exemplary embodiment of the present invention for which mechanical dispersion treatment and centrifugation were performed at least twice after mixing a graphene oxide aqueous slurry and a non-aqueous based solvent. Additionally, (B) shows the sol solution for a graphene oxide-ceramic hybrid coating layer according to one exemplary embodiment of the present invention for which mechanical dispersion treatment and centrifugation were performed once after mixing a graphene oxide aqueous slurry and a non-aqueous based solvent.

The properties, such as viscosity or color, may not be significantly different during preparation of the graphene oxide-ceramic hybrid sol solution based on the number of mechanical dispersion treatments and centrifugation. As shown in FIG. 5, storage stability of the graphene oxide-ceramic hybrid sol solution may be improved when the mechanical dispersion treatment and centrifugation are performed at least twice. This result suggests that the present invention may provide a sol solution for a graphene oxide-ceramic hybrid coating layer having improved storage stability.

Figure 6:
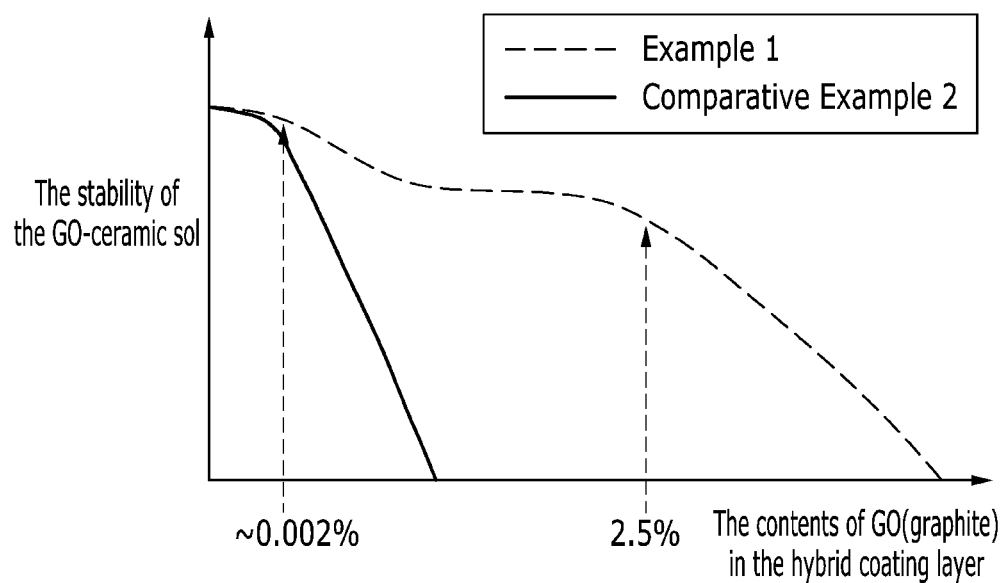
FIG. 6 is an exemplary graph showing storage stability of graphene oxide-ceramic hybrid sol solutions according to Evaluation 3 of the present invention.

FIG. 6 is an exemplary graph showing a storage stability value of the graphene oxide-ceramic hybrid coating layer in the exemplary embodiment of the present invention compared to that of the coating layer produced by conventional method. Further, cloudiness and precipitation of a solution may be regarded in comprehension of decreased storage stability of a coating layer.

Furthermore, referring to FIG. 6, the graphene oxide-ceramic hybrid sol solution was stably stored when the graphene content included in a graphene oxide-ceramic hybrid layer was in a range of about 0.002 to about 2.5 wt %. In addition, a graphene oxide-ceramic hybrid sol solution with the graphene content less than 0.001 wt % was not stably stored.

Evaluation 4

Transparency of Coating Layer of Graphene Oxide-Ceramic Hybrid

Figure 7:
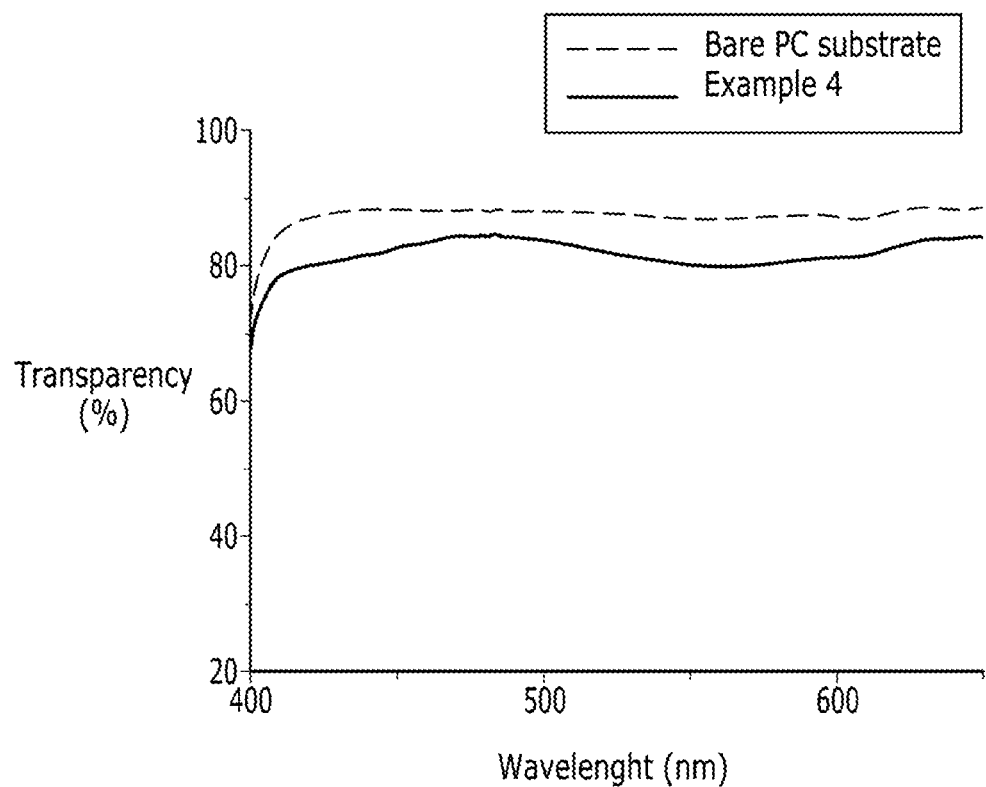
FIG. 7 is an exemplary graph showing transparency of the graphene oxide-ceramic hybrid coating layer according to Evaluation 4 of the present invention.

A UV-Vis spectropotometer (JASCO, V-530) was used to measure transparency of a graphene oxide-$SiO_2$ hybrid coating layer, and the result is shown in FIG. 7. Referring to FIG. 7, the graphene-$SiO_2$ hybrid coating layer had transmittance of 81% at a wavelength of 550 nm, and herein, included graphene oxide in an amount of 0.5 wt % at a thickness of 1100 nm.

Evaluation 5

Thermal Conductivity of Coating Layer of Graphene Oxide-Ceramic Hybrid

Figure 8:
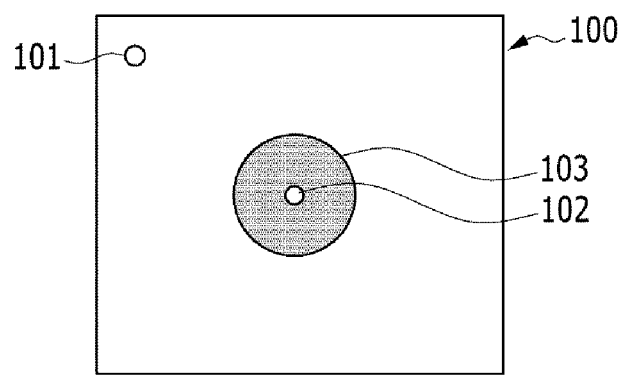
FIG. 8 shows exemplary images and a diagram illustrating an apparatus and a method for evaluating thermal conductivity of a graphene oxide-ceramic hybrid coating layer according to Evaluation 5 of the present invention; and It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

Thermal conductivity of a transparent coating layer of a graphene oxide-ceramic hybrid prepared according to an exemplary embodiment of the present invention was evaluated using a thermal conductivity measuring apparatus. FIG. 8 shows exemplary images and a diagram illustrating showing the measuring apparatus and a method for evaluating thermal conductivity of a graphene oxide-ceramic hybrid coating layer according to one exemplary embodiment of the present invention.

The apparatus for evaluating thermal conductivity of a graphene oxide-ceramic hybrid coating layer is illustrated in FIG. 8. A thermocouple (TC2) in the center 102 of a PC-substrate 100 (e.g., with a size of 10 cm×10 cm and a thickness of 2 mm) was heated up to 120° C. using a halogen lamp as a heating source 103 (e.g., a heating shape: a circle with a diameter of 5 cm), and simultaneously, a temperature TC1 on the measurement point of substrate edge temperature 101 of the substrate was measured.

As a result of comparing and examining a bare PC substrate, a ceramic sol coating layer formed of a pure sol solution, and a graphene oxide-ceramic hybrid coating layer according to one exemplary embodiment of the present invention with the measuring apparatus in FIG. 8, a 1000 nm-thick substrate that includes 0.1% of graphene oxide showed greater than or equal to about 7 times improved surface thermal conductivity than the substrate before being coated with a graphene oxide-$TiO_2$ ceramic hybrid coating layer. In addition, the 1000 nm-thick substrate that includes 0.1% of graphene oxide showed greater than or equal to about 4 times improved surface thermal conductivity than a substrate coated with a ceramic sol according to Comparative Example 1.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

DESCRIPTION OF SYMBOLS

100: PC (polycarbonate) substrate
101: measurement point of substrate edge temperature
102: thermocouple (center of PC substrate)
103: heating shape by heating source

What is claimed is:

1. A method for preparing a graphene oxide-ceramic hybrid coating layer comprising:
preparing a solution that includes a graphene oxide slurry, whereby an aqueous surface environment of the graphene oxide slurry is replaced by a first non-aqueous based solvent;
combining the solution with a second non-aqueous based solvent and a ceramic precursor to prepare a mixture;
adding a dispersing agent and water to the mixture to prepare a graphene oxide-ceramic hybrid sol solution; and
coating a substrate with the graphene oxide-ceramic hybrid sol solution.

2. The method of claim 1, wherein the process of preparing the solution that includes the graphene oxide slurry replaced by the first non-aqueous based solvent includes:
performing mechanical dispersion treatment and centrifugation after mixing the graphene oxide aqueous slurry and the first non-aqueous based solvent.

3. The method of claim 2, wherein the mechanical dispersion treatment and centrifugation is performed at least twice, and the method further includes separating a supernatant after each centrifugation.

4. The method of claim 2, wherein the mechanical dispersion treatment is performed by ultrasonication, stirring, shear stress (shearing force) application, using a homogenizer, or a combination thereof.

5. The method of claim 2, wherein the centrifugation is performed at a rotation speed of about 1200 to about 3500 rpm.

6. The method of claim 1, wherein the graphene oxide in the graphene oxide slurry replaced by the first non-aqueous based solvent is included in an amount of about 2 to about 7 wt % based on the total weight of the graphene oxide slurry replaced by the first non-aqueous based solvent.

7. The method of claim 1, wherein the first non-aqueous based solvent or the second non-aqueous based solvent is an amphiphilic solvent, a water-miscible solvent, a water-immiscible solvent, a polar solvent, a nonpolar solvent, or a combination thereof.

8. The method of claim 1, wherein the first non-aqueous based solvent or the second non-aqueous based solvent is IPA, ethanol, acetone, methylethylketone, methyl alcohol, ethyl alcohol, isopropyl alcohol, acetylacetone, butyl alcohol, ethylene glycol, polyethylene glycol, tetrahydrofuran, dimethylformamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, or a combination thereof.

9. The method of claim 1, wherein the dispersing agent is polyethylene glycol (PEG), glycerol, hydrochloric acid (HCl), acetic acid, formic acid, citric acid, a polymer, or a combination thereof.

10. The method of claim 1, wherein the sol solution for the graphene oxide-ceramic hybrid coating layer composition further includes an additive selected from the group consisting of: polyethylene glycol, glycerin, glucose, a polymer, and a combination thereof.

11. The method of claim 1, wherein the coating process is performed by dip coating, spin coating, spray coating, paint coating, bar coating, flow coating, roll coating, or a combination thereof.

* * * * *